July 31, 1956     V. K. ZWORYKIN     2,757,226
SECRET TELEVISION SYSTEMS
Filed Oct. 23, 1950     4 Sheets-Sheet 1
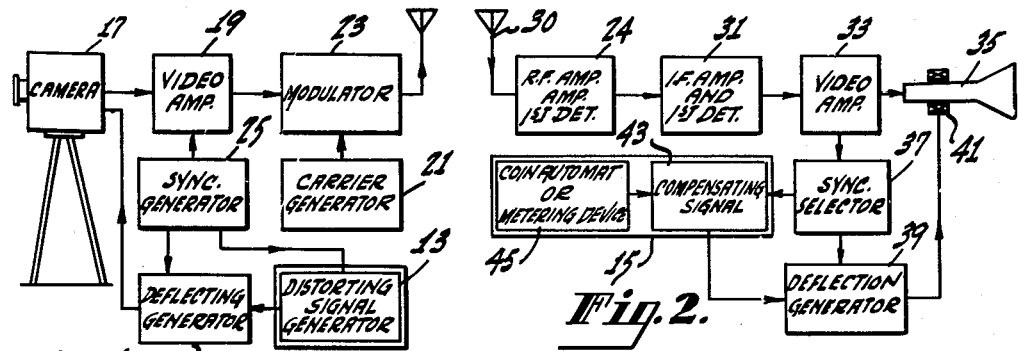
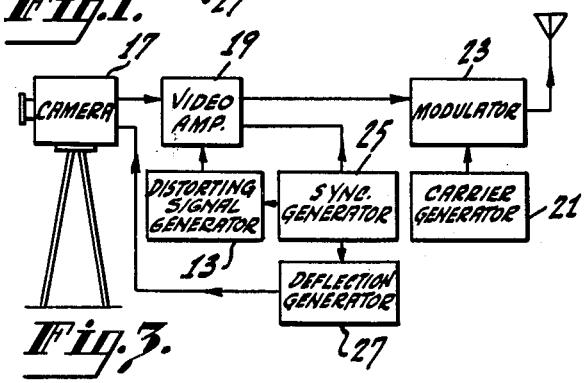
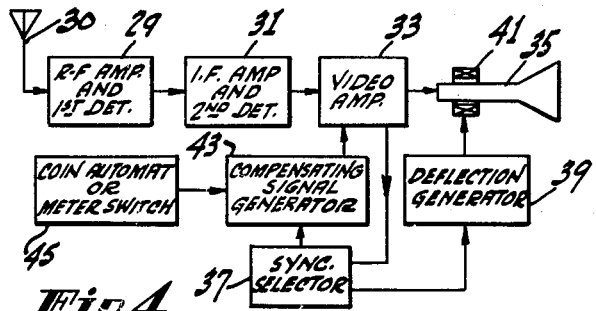
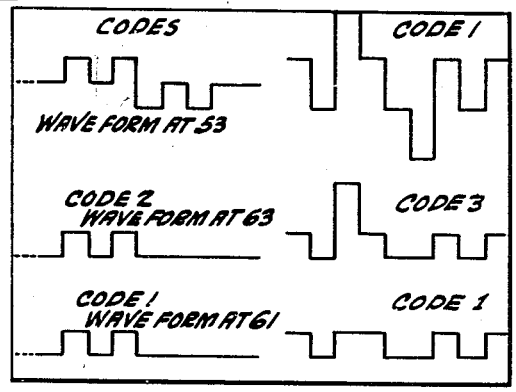
INVENTOR
VLADIMIR K. ZWORYKIN
ATTORNEY

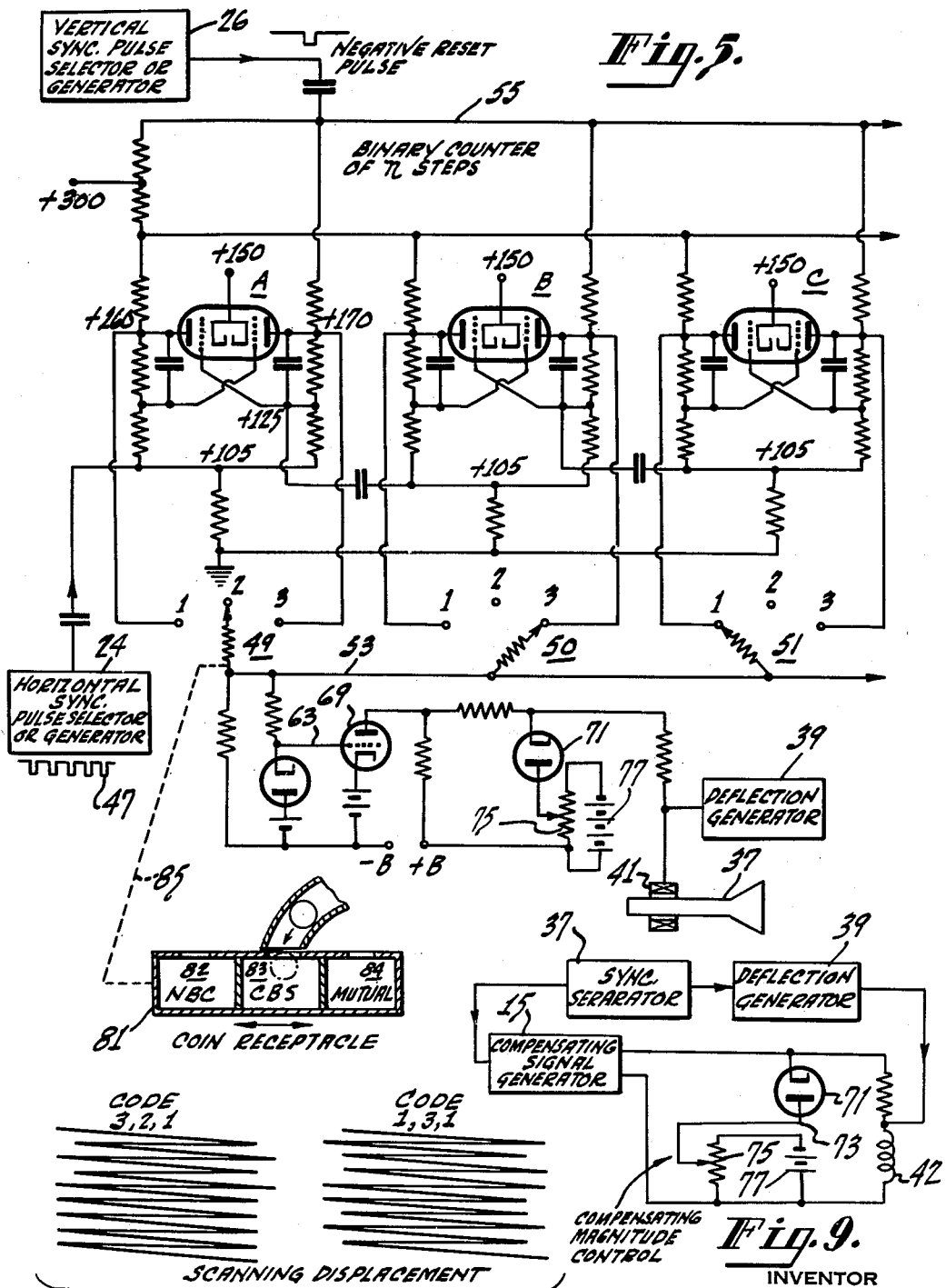

July 31, 1956  V. K. ZWORYKIN  2,757,226
SECRET TELEVISION SYSTEMS
Filed Oct. 23, 1950  4 Sheets-Sheet 3
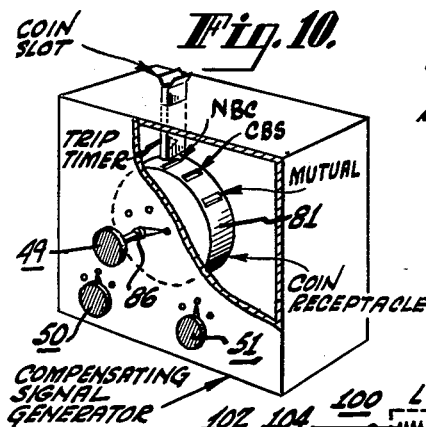
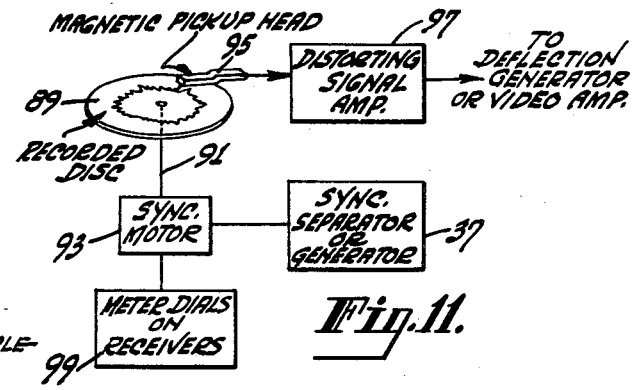
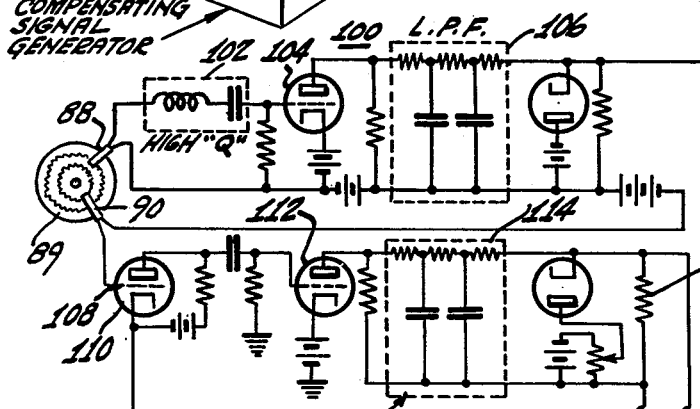
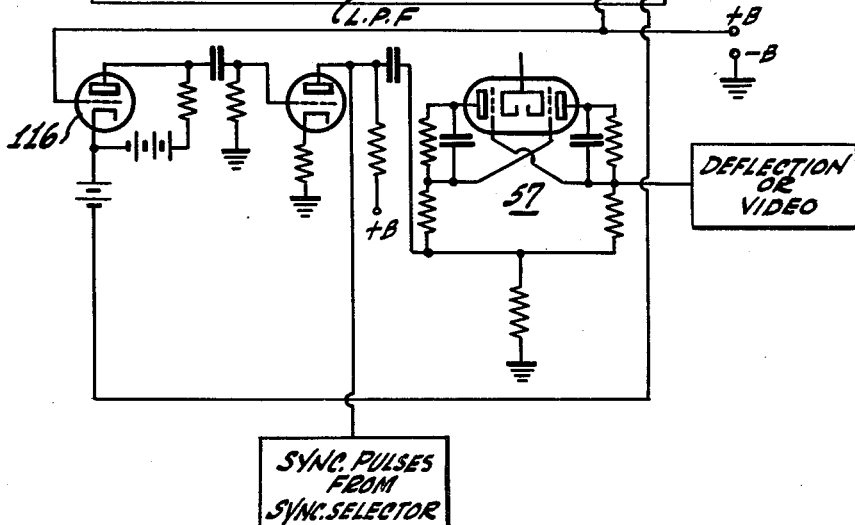
Inventor
VLADIMIR K ZWORYKIN
By
Attorney July 31, 1956 V. K. ZWORYKIN 2,757,226
SECRET TELEVISION SYSTEMS
Filed Oct. 23, 1950 4 Sheets—Sheet 4
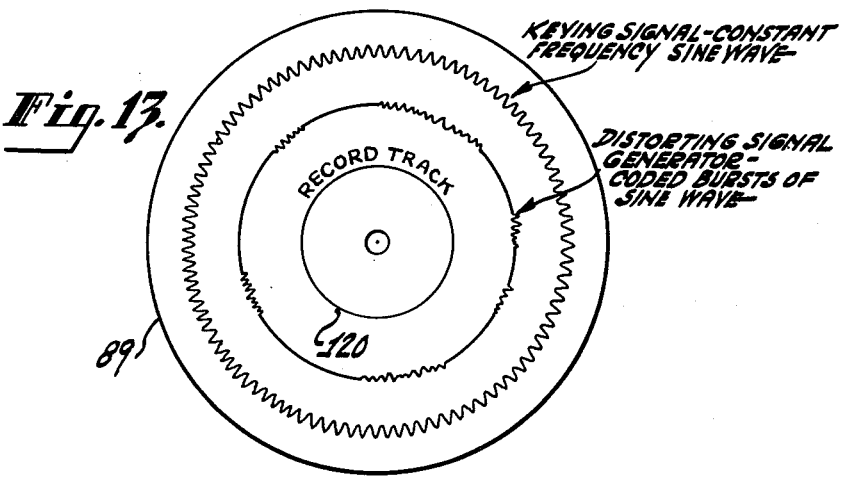
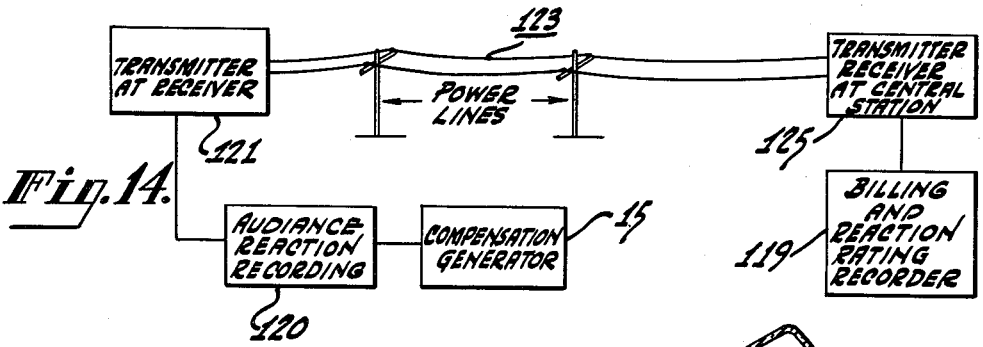
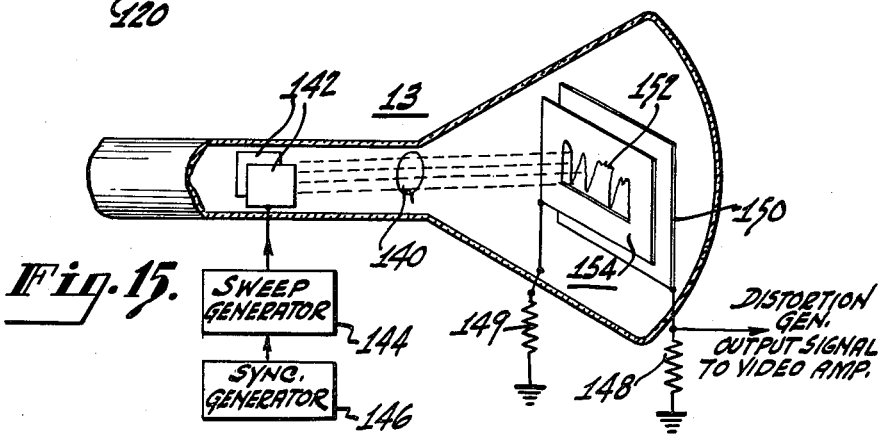
INVENTOR
VLADIMIR K. ZWORYKIN
BY
ATTORNEY

United States Patent Office 2,757,226
Patented July 31, 1956

2,757,226

SECRET TELEVISION SYSTEMS

Vladimir K. Zworykin, Princeton Township, Mercer County, N. J., assignor to Radio Corporation of America, a corporation of Delaware Application October 23, 1950, Serial No. 191,555

8 Claims. (Cl. 178—5.1)

This invention relates generally to secret signalling systems for distorting intelligence signals at the transmitter and removing the distortion at the receiver, and more particularly it relates to television systems which provide for participation in financing of programs by an audience.

In some instances, high quality television programs, whose costs exceed advertising revenues, or whose character would not tolerate the intrusion of advertising, are not available for general television audience consumption. It is clear, for example, that current motion picture productions, which the film studios could not afford to release for general consumption unless the proper revenues were derived therefrom, are at present probably withheld from television audiences because an acceptable system for audience-financing is not available.

Efforts have been made to provide systems for secretly transmitting programs in accordance with a predetermined signal from the subscribed or television viewer, or in accordance with a plurality of scrambled video wave components received and properly assembled at a television receiver. Some of these systems provide for expensive equipment which may in addition be difficult to maintain in operation. In such systems, the cost of wire connections between the producer and consumer is prohibitive. Also systems for providing variable frequency synchronization signals or irregular interlace scanning cannot easily be adjusted for proper operation, without expensive equipment. A simplified system is therefore needed to provide secrecy of transmission as well as additional means for permitting the audience to participate in financing programs secretly transmitted.

Although prior art systems for audience financing are in some cases technically feasible for sending the programs to the consumer, they, in general, have the basic drawback of demanding from the distribution source or collection agency such a large proportion of the available revenue that the actual program producers may not realize a large enough revenue to warrant extensive use of such a system. A system affording ease of program distribution and revenue collection is therefore also desirable.

In the systems of the prior art, it has been difficult to provide proper distribution revenues, which have been collected, in such a manner that the producer of each separate program is reimbursed for his proportionate share of expenditure. Therefore a system is required in which the collected revenues may be distributed to any one of the several production groups or program sources which may supply programs to the television audience. In addition, it is preferable in many cases to provide a system wherein different rates may be charged for the same time periods of television use, since the costs of producing one program may be radically different from that of producing others.

It may be anticipated that, in any audience-financed television system, without proper safeguards, unauthorized firms or individuals may "bootleg" or obtain the benefit of the audience financed program without sharing the costs. Thus, a system should be provided in which the intelligible transfer of messages is accomplished in accordance with a large number of settings or "combinations" which may be easily changed from time to time or in which the equipment is of a unique character which is hard to duplicate. In such a system the necessity of having to modify any bootlegging equipment at frequent intervals or having to provide the unique equipment should act as an adequate deterrent on any illicit system for receiving the programs without sharing the costs.

A system of this nature must also be adaptable for use with a single television channel, which may be shared by several broadcasters, or which may be extended to a number of different channels, which are each assigned to individual broadcasters. In either case there must be a proper distribution of the revenue proceeds between the respective program broadcasting sources.

The collection of revenues in an audience-financed system presents a problem. If a coin operated device is used, it is necessary to send a collector around to the individual users or receiver owners at frequent intervals. Not only does this involve the possibility of fraud by the collector, but the collection cost is excessive when compared with the individual amounts of revenue which may be collected from the homes of television receiver owners. It would, therefore, be desirable to provide a system which affords a simplified accounting or revenue collection system, so that audience-financed programs may be practically sent into home television receivers rather than to receivers located in studios or theatres.

It is also desirable, when transmitting programs of the type received by audience-financed systems, that information be acquired from the audience in order to provide a reliable guide to the relative popularity of individual programs. Therefore equipment for financing television programs should be easily adaptable for providing audience-reaction information, when required.

Accessory equipment for converting a standard television receiver or transmitter to provide the necessary operational features is desirable rather than a specially designed complete system. This equipment in addition to meeting the requisite operational functions desirable and providing no interference with normal reception, must in addition be simple enough to license or sell to the home television receiver owner at a reasonable cost. Furthermore, the system should not require any auxiliary wire lines, the cost of installing and maintaining of which would be prohibitive.

Therefore, it is a general object of the invention to provide simplified and improved means and methods for permitting audiences to finance high quality television programs.

It is another object of the invention to provide an audience-financed television system in which collected revenues may be distributed to the actual producer of the received programs in proportion to the amount of expenditure by the producer.

Another object of the invention is to provide a wireless television system of the audience-financed type wherein it is difficult to receive audience-financed programs without sharing the cost.

It is a further object of the invention to provide a system for audience financing which provides an attractive method for measuring audience reaction to television programs.

There is therefore provided in accordance with the invention a system whereby audience-financed programs may be distorted at the television transmitter and wherein the distortion may be removed from the picture at the receiver by means licensed to the owner of the receiver. Means is provided for periodically changing the distortion characteristics to prevent bootlegging of the programs. Other modifications and means are provided for billing the set user and properly distributing the earnings, as well as for transmitting the audience reaction of the subscriber.

For a further understanding of the invention, together with other objects and advantages thereof, reference may be made to the following detailed description to be read in connection with the accompanying drawings in which:

Figures 1 and 2 are block diagrams of an audience-financed television transmitting and receiving system in accordance with the invention;

Figures 3 and 4 are block diagrams of audience-financed television transmitting and receiving equipment in accordance with a further embodiment of the invention;

Figure 5 is a schematic circuit diagram of a binary counter coding arrangement of the invention;

Figure 6 is a chart illustrating the operation of the coding system of Figure 5;

Figure 7 is a wave form analysis of operation of the coding system of Figure 5;

Figure 8 is a diagrammatic representation of a reproduced visual image distorted in accordance with one phase of the invention;

Figure 9 is a circuit diagram of a deflection generator system according to a further phase of the invention;

Figure 10 is a perspective view of a compensating signal generator coin receptacle illustrating an embodiment of a still further phase of the invention;

Figures 11 and 12 show further block and schematic circuit embodiments of the invention comprising a distortion generator utilizing coded record disks;

Figure 13 is a plan view of a coded record disk of the invention;

Figure 14 is a block diagram of a modification of the invention illustrating a means for relaying information recorded upon the disk of Figure 13; and, Figure 15 illustrates a cathode ray distortion signal generator which may be used in accordance with the invention.

Referring now to the drawings, wherein like reference characters represent like elements throughout the different views, and referring in particular to Figures 1 and 2, a television system is shown in block diagram, in which a television transmitter (Figure 1) and receiver (Figure 2) are supplied with auxiliary elements, thereby converting an otherwise conventional system to an audience-financed system. The auxiliary elements comprise a distorting signal generator 13 in the transmitter and a compensating signal system 15 in the receiver.

Thus a transmitter is provided with an electronic device, such as a camera 17, for reproducing visual images by supplying a corresponding video signal, which is amplified in the video amplifier 19. The video signal is in turn coupled to the modulator circuit 23 for modulating carrier waves produced by the carrier generator 21. As in any conventional television transmitter, a synchronization signal generator 25 is supplied to provide proper scanning or deflection of the visual image by the camera 17. Actuation of the scanning means or deflecting generator 27 is provided in accordance with pulses from the synchronizing signal generator 25. Only the single additional element, comprising the distorting signal generator 13, and shown in double block diagram is therefore required to convert the transmitter for audience-financed operation.

The distorting signal generator 13 is also connected for operating the deflecting generator 27, thereby comprising means for modulating the output scanning signal to cause amplitude modulation of the deflection voltage. Thus, irregular scanning displacement or image distortion is caused in a visual image reproduced in a conventional receiver without adequate compensating means. Therefore the distortion signal generator is designed to provide coded signals of a predetermined pattern, whereby secrecy of the video signal may be preserved when the distortion signals are applied to the transmitter.

At the receiver, an incoming television signal is supplied to a radio-frequency amplifier 29 by a receiving antenna 30. A succeeding amplifier system 31 and video amplifier circuit 33 demodulates the video input signal and applies it at the input of a further device for electronically reproducing visual images, comprising the kinescope 35. A synchronization signal selector circuit 37 is connected to the video amplifier to derive from the transmitted video signal a synchronization pulse for the kinescope 35, in accordance with well known principles. It is to be noted that a vertical synchronizing pulse is supplied for each frame or visual field while a horizontal synchronizing pulse is supplied for each line or horizontal scanning cycle of the field.

The synchronization pulses selected at the receiver are used to initiate the scanning or deflecting signal in the deflection generator 39. A deflection voltage therefrom is in turn applied to the kinescope 35 by means of deflecting coils 41, or the like. Thus far the receiver circuit is conventional, and the compensating signal means or system shown in the double block diagram 15 will provide at the receiver means for decoding the distorted video signal produced by the modified transmitter.

A compensating signal generator 43 may be provided having output signals corresponding to the same predetermined pattern supplied by the distorting signal generator 13 in the transmitter. In the described deflection distortion system these compensating signals, if identical with the output of the distorting signal generator will cancel out any distortion effect at the receiver. Further, there is provided at the receiver a coin automat or metering device 45 used in order to provide a basis for properly sharing the cost of television programs by the receiving audience.

Figures 3 and 4 show other similar systems for audience financing of television programs, in which the reproduced visual image is irregularly distorted in accordance with the coded distortion pattern by modulating the brightness level of the video signal. This causes irregular brightness of the reproduced visual image at the receiver, when no compensating signal generator of the proper type is used.

In this system, the distorting signal generator 13 is connected at the transmitter to the video amplifier circuit 19 rather than the deflection generator 27. In the receiver likewise the compensating signal generator output is connected to the video amplifier so that the distortion signal component which may be transmitted upon the video signal is removed. Otherwise the systems are identical.

In the present audience-financed television system therefore, means for secretly transmitting programs is provided, in which irregular distortion of the reproduced visual image is caused at the camera and compensated for at the receiving kinescope. An uncompensated receiver therefore provides a distorted image. Although prior distortion systems for secret television are known, such as in irregular interlace scanning systems such as disclosed by Mayle in U. S. Patent 2,472,774, and irregular synchronization pulse frequency systems such as disclosed by Rosenthal in U. S. Patent 2,251,525, these known systems do not provide for irregular distortion of the visual image reproduced by the television camera and the receiver kinescope.

The present system is not limited to application in interlaced scanning systems, although exceptionally adapted for use therein, since the coding signal may be mixed up between the two or more fields per frame, and therefore become more difficult for unauthorized receivers to decode.

Neither is the present system susceptible to abnormal brightness or flickering of the picture caused by a changing sweep frequency or a changing interlace pattern, nor limited in the number of coding signals available. In the present irregular image or amplitude modulated distortion system either the irregular brightness or irregular scanning displacement may be easily adjusted for proper amplitude at the receiver to give complete decoding or restoration of the image without any flickering or loss of synchronism.

Both systems disclosed in this invention for distorting the visual image are practicable. However, the system for causing irregular scanning displacement of the reproduced visual image is preferable in some cases rather than the system for causing irregular brightness. This is true, because conventional television systems have direct current restorer circuits or the like which may in some cases reduce the effectiveness of causing irregular brightness of reproduced visual image. It is to be recognized, however, that even should intelligence be discernable in a system not properly decoding the distorted signal, the resulting picture quality would nevertheless be so bad that reception would not be desirable, even if the automatic gain or picture brightness level circuits were capable of compensating for the irregular brightness modulation to a large extent.

Irregular image distortion may be accomplished by any suitable coding or distortion signal generator. However, as hereinbefore noted, a device is preferable which is adapted for a large number of coded combinations. Furthermore, these combinations should be easily changed from time to time. For this reason a binary counter system, such as shown in Figure 5, is well suited for use in the invention. The manner of operation of binary counter systems of this type is well known in the art, and therefore need not be discussed in detail. However, a discussion of such operation as will be necessary for a clear understanding of the invention will be found in the ensuing description of the invention. A complete summary of operation of a binary counter similar to that of Figure 5 is published in an article entitled "A four tube counter decade," by John D. Potter; Electronics, June 1944; page 110

In the present counter system which may operate either as a distorting or compensating signal generator, $n$ counting steps A, B, C, . . . are supplied wherein each step comprises a two stage multivibrator circuit. Although any number of steps may be chosen, as desired, a three step counter is shown for purposes of illustration. Thus the counting steps A, B, C are shown in combination with other circuit elements to comprise a distorting signal generator, which supplies the proper coded output signal to the deflecting generator 27. An irregular scanning displacement is thereby caused in the kinescope 37 by the modulated output signal of the deflection generator 27.

Proper voltages are designated in the counter stage A for operation when the right hand multivibrator tube section is conducting, as becomes the case immediately after the counter system has been reset. In this reset condition, the right hand tube section of each counter stage is normally conducting, and the entire counter circuit is in position to count negative pulses from the horizontal or line synchronizing source 24. The output wave form of the synchronizing source 24, which may be a pulse selector in the receiving circuit or a generator in a transmitting circuit, should comprise negative pulses as shown by the wave form 47.

Coding switches 49, 50, 51 are provided to select a voltage output signal from each corresponding counter step. Each switch has settings 1, 2, 3, and there is provided at the respective switch settings, output voltage taken from the left section of the corresponding counter tube, an open circuit and consequently zero voltage output, and output pulses from the right hand counter section. Thus a plurality of coded signals may be selected by choosing different settings of the switches. A total of $3^n$ code positions is possible where $n$ is the number of counting steps.

The chart of Figure 6 may be used to determine the code signal waveform available at the common output lead 53 of all the switch arms. Thus the conduction condition of each multivibrator section is listed in the table for each counting step A, B or C, as the switch arm is closed with contacts 1 and 3. When the switch arm is connected to contact 2, no output signal is transferred to the common switch arm connection 53. In the chart "+" denotes conducting condition of the respective multivibrator section to which the switch contact is connected and "0" denotes nonconducting condition. Accordingly in determining from the chart which code signals will be available in the common switching arm connection 53 for different code settings, it is taken into consideration that each horizontal synchronization pulse will cause the counter system to be changed by a count of one as shown in the succeeding line or horizontal row on the chart.

A negative pulse will be available at one switch terminal when the corresponding tube section is changed from a nonconducting condition to a conducting condition, and a positive pulse as the condition is reversed. A negative pulse must be supplied to each succeeding stage to change the conducting condition therein. A résumé of the composite wave form found at the common switch arm lead 53 for two different code settings is shown in the first line of Figure 7. The other wave forms of Figure 7 are taken at different points in the distortion signal generator circuit and will be explained hereinafter.

A forced reset of the entire counter system is made in accordance with the field or frame synchronization signal, which provides a negative reset pulse at the circuit connection 55 common to each of the binary counter steps. In this manner the distortion signal may be synchronized to cause distortion of the same lines in each frame at both the receiver and transmitter. Thus a complete decoding is possible under normal conditions. When proper decoding is not used at the receiver, displacement of many lines at random will provide a distorted image of such a nature that it cannot be resolved by the eye. Sample field pattern portions of such distorted images for designated codes in the three step counter described, when in an irregular scanning displacement system, are shown in Figure 8.

The coded portion of the distorted field pattern is repetitive over the entire field. Therefore a smaller number of counting steps is needed than that which would give coding over the entire field or image. The beginning of each field, however, will be started out with the same coding arrangement because of the negative reset pulse from the field or frame synchronization signal source 26. As before explained, when interlaced scanning is used, the code is even more effective since each scanning field may be coded in a different sequence.

Modification of the composite wave form available at the common switch arm connection 53 is necessary since the code pulses are not of uniform amplitude. It is preferable therefore to provide additional equipment to cause irregular displacement of entire scanning lines by fixed amounts. For this reason, the additional pulse modifying stage 59 is supplied, which causes at the output lead 61 of the deflection generator a wave form as shown in line 3 of Figure 7. When such a waveform is superposed on the deflection wave it causes scanning displacement of entire lines or groups of entire lines depending upon the code selected.

For a clear understanding of the wave form modifying circuit, the wave form at the input of the pentode 69 is shown in line 2 of Figure 7. Thus the composite signal at the common switch arm connection 53 is clipped or converted by action of the diode rectifier 65 to a series of positive pulses which are applied at the input lead 63 of the amplifier tube 69. The amplified output signal will therefore comprise an integrated wave form which provides deflection over an entire line or any integer multiple thereof as indicated by the code signal chosen.

In order to provide complete cancellation of the distortion signal at the receiver, a compensation magnitude circuit is desirable as shown in Figure 9. In this circuit, which may be used in irregular deflection systems, the diode 71 serves to give the deflecting current pulses a fixed amplitude. Terminals 73 for a variable voltage supply source are coupled from one side of the yoke to the rectifier 71 so that the deflection magnitude may be adjusted by changing the voltage of the variable supply. The magnitude control may comprise an adjustable resistor 75 connected across a battery 77 or any other suitable variable voltage supply source. Likewise a compensation magnitude control is necessary in an irregular brightness distortion system. Such a device could be any one of a number of variable gain or variable bias devices in the received video amplifier stage.

As discussed hereinbefore, it is desirable in an audience-financed television system to provide mean for distributing revenues to different program sources. Means for accomplishing this, shown in Figure 5, comprises a coin receptacle 81 with a plurality of compartments 82, 83, 84 designated to receive coins for distribution to the different program sources. These sources might be, for example, National Broadcasting Company (NBC), Columbia Broadcasting Company (CBS), and Mutual Broadcasting Company, or others as desired.

The coin receptacle is ganged by means of a suitable mechanical linkage 85 to one of the coding switch arms. Thus, a code number may be assigned to designate different program sources. It is clear, therefore, that when the proper decoding signal is provided that the revenue or some other suitable billing information is properly assigned to the organization providing the corresponding coded program. It is to be understood that any other means for distributing revenues or billing the consumer may be ganged with the coding switch, as desired, and the invention is not limited to the use of a coin receptacle. A time period recorder might be used or separate metering dials or any suitable billing device which may be assigned to different sources automatically by a portion of the code. The essential feature of this embodiment is that a device is selectively actuated in accordance with a portion of the distortion signal to designate the proper distribution of revenues available from the audience.

One such mechanism for distributing the revenues is shown in Figure 10 wherein the movable coin receptacle is linked to the switch arm 49 by means of a rotary shaft. Such a coin actuated mechanism is in operation entirely adequate. However, the collection of revenues from the individual compensating signal generator which may be distributed to home television users over a wide area is not entirely satisfactory under all conditions. It is easily seen that in some cases the cost of collecting the revenues at the home receiver would be large.

It is therefore contemplated that other equipment may be devised wherein the distribution of finances or the collection of licensing fees may be accomplished without sending a coin collector around to the home of the receiver owner. For example, one system might involve the use of separate recorders or metering devices corresponding to different settings of the code selector switches. Billing then might be based upon the periodic inspection of the meter device or recorder.

The only serious source of fraud in the above described system would consist in the illicit copying and sales of the compensating signal generator. Of course since the total number of settings on the binary counter system presently described is $3^n$ where $n$ is the number of counting steps, a seven step counter will give more than a 1,000 alternative setting. It would not therefore be a simple matter to find the right code in a multiple step counter system even should the signal generator be copied and sold. License fees might therefore be obtained for such equipment by subscriptions to program code lists, or the like, or a combination of this with any of the above described billing or collecting devices.

Illicit copying of the compensating signal apparatus could be rendered ineffective by recording the compensating signal itself on a coded disk. The disk might be plastic or any suitable recording medium and would preferably be coated with a magnetic material comprising one or more recording tracks. With such disks, replacements might be required at stated intervals to correspond to changes in coding. Collection could be made through a central agency and an accounting made for distributing the funds according to the sale of disks. Individual disks might be adapted for particular programs, time periods, or television channels to provide the desired accounting information.

To be more specific, the disk 89, as used in the system shown in Figure 11, might be engaged by a notched spindle or drive mechanism 91 and driven by a synchronous motor 93. The motor 93 should be actuated in accordance with signals from a synchronizing device such as a synchronization pulse separator or generator 37. A suitable recording pickup head 95 and a distorting signal amplifier 97 then provides the distortion signal at the deflection generator or video amplifier.

As indicated above, meter dials 99 may be used in the receivers to provide proper billing information and may be connected directly to the synchronous motor 93 to indicate the time period during which the recorded disk is used. A two inch disk 89 would be ample in dimensions for this purpose, and would be easily adaptable for use with either the transmitting station or the receiver set.

A number of different methods of recording and billing could be embodied with this basic system, as follows:

1. Individual disks might serve for different programs and be identified. After use the disk would drop into a sealed receptacle and a service man would collect them periodically for use in billing of the customer, distribution of earnings and for statistical purposes.

2. Identical disks could be used for different programs and the time and channel number identifying the program would be printed or magnetically recorded on the disk at the receiver as the compensating signal is switched on. Then distribution of earnings and billing of the consumer then would be determined by relaying the recorded information to the central billing agency.

3. A single disk could be embodied during any one stated time period. The time and channel number could be recorded magnetically on the disk by a separate magnetic head which might be displaced along a spiral path by $\frac{1}{10}$ inch or less after every record. A binary 16 digit figure will suffice to identify every 15 minute period in a month along with the channel number for 12 channels. Such a recording would appear as follows:

start     channel     time (quarter hours from first of month) 2700

1    1 1 0 1    0 1 0 1 0 1 0 0 0 1 1 0

The disk could be changed periodically for a new one and be decoded by magnetic recorders in a central station. Tabulating machines would add up the information contained upon the record and facilitate billing, distributions of earnings and statistical surveys.

In addition to the audience-financing which this system achieves, it may be readily modified to supply in addition information on the audience reaction to the audience-financed program. Thus by providing a set of controls on the compensating signal generator marked excellent, good, fair, unsatisfactory and objectionable, the customer may be enabled to record his judgment of each program, at the end, following the identification of the program. By this means a reliable guide to the relative popularity might be used for approval or disapproval of extending programs to a free or advertising-financed status or for fixing advertising rates therefor.

Figure 12 shows a complete system for using the recorded disk 89 as a distortion signal generator. The disk may be of the type shown in Figure 13 having a plurality of recording tracks. Therein the outer recording track is for a keying signal which may be a constant frequency sine wave, or the like. It may serve to prevent interchangeability of disks between subscribers and hence their "bootlegging" by counterfeiters. The central track then comprises the distorting signal generating means, and has recorded thereon irregularly intermingled high frequency code bursts and null portions comprising a coded combination. A third or recording track is provided for recording at the receiver information pertaining to audience reaction, time periods during which the aforementioned tracks are in use, or other billing information.

Since means for recording the necessary information upon the magnetic disk is well known in the art it need not be described herein. However, in Figure 12 the equipment shown and hereinafter described will more clearly point out this phase of the invention, in which the coding disk is used. The first keying circuit 100 is therein provided having a high Q or highly selective circuit 102 resonant at the keying signal frequency.

A succeeding amplifier tube 104 for the keying signal has in its input circuit a first magnetic pick-up device 88, and in its output circuit a low pass filter 106 which alters the keying sine wave signal to provide a direct current keying pulse. The direct current keying pulse acts as a bias to unblock the control electrode 108 of the first distorting signal amplifier tube 110. Therefore, since the coded signal is provided at the tube input circuit by the second magnetic pick-up device 90, the distorting signal or code is amplified at a succeeding amplifier tube 112.

A low pass filter network 114 in the output circuit of the amplifier stage 112 eliminates the high frequency sine wave code burst and provides a series of direct current output signal pulses of fixed amplitude across the input resistor 115 or a further amplifier stage 116. The negative horizontal synchronization pulses superposed on the amplified code pulses are in turn applied at the multivibrator stage 57, causing it to change its state of operation whenever the horizontal pulse is superposed on a negative portion of the code pulse wave, whereas a horizontal pulse superposed on a positive portion of the wave is without effect. The output of the multivibrator stage controls the deflection (or the video signal) in the same manner as the counter output in Figs. 5 and 9. Furthermore the multivibrator stage 57 is "reset" by the vertical synchronization pulses in the same manner as the binary counter in Fig. 5.

The whole process of collecting, billing or audience reaction information may be rendered automatic by the system shown in Figure 14. The record is transmitted automatically to a central station where billing and audience reaction is recorded at 119. This process may be accomplished by transmitting from the television receiver when it is actuated by radio pulses from the central station. These pulses may be transmitted over the power lines 123 or telephone lines during an inactive period, such as the early hours of the morning. Information from the receiver station is then received 125 and recorded 119 at the central station.

During this period the central station might transmit in succession different keying pulses opening different receiver channels and actuating the signal transmission system at the receiver station of different subscribers. Audience reaction recordings 120 and billing records would be transferred to a master recording system 119 where they are subsequently tabulated and analyzed. This device would of course eliminate the necessity of periodic visits of the service man and give a more rapid indication of audience response.

It is noted that the coding equipment is not necessarily limited to the binary counter or the magnetic disk but may have other forms such as the cathode ray device of Figure 15. In this case the unique character of the cathode ray device would deter any efforts to bootleg signals. Thus the vertical ribbon-shaped cathode ray beam 140 is deflected between the deflection plates 142 by means of a signal supplied by the sweep generator 144, which in turn is driven by a synchronization generating device 146. The distortion signal generator therefore provides an output signal for the video amplifier or deflecting circuits of the output resistor 148 connected from a collecting anode 150 to ground. The output signal has characteristics determined by the portion of the cathode ray beam 140 striking the collecting anode 150 through the irregularly shaped aperture 152 in the masking arrangement 154.

A converse signal could be produced at a further resistor 149 connected from the mask to ground. This also would disperse electrons not collected at the anode 150. In this system the make defines an irregular aperture 152 which in combination with the ribbon beam provides a coded or distortion voltage corresponding to the contour of the aperture. It is therefore easily seen that this distortion signal generator will also provide the requisite features necessary for combination with the present invention.

There is therefore provided by the invention novel means and methods for audience-financing television programs. Simplified auxiliary equipment is provided in accordance with one feature of the invention, and bootlegging is discouraged in accordance with other features of the invention. Further features of the invention include means for readily billing the home television owner with respect to his proportionate share of costs of producing the received programs.

What is claimed is:

1. A distortion signal generator system for audience-financed television apparatus, or the like, comprising in combination, a source of frame synchronizing signals, a source of line synchronizing pulses, a binary counter of $n$ steps, each step comprising a two stage multivibrator, a reset circuit coupled with said frame synchronizing signal source for causing reset of said counter in accordance with the frame synchronization signals, a counter stepping circuit coupled with said source of line synchronizing pulses for causing said counter to count the pulses from said line synchronizing source, a plurality of coding switch terminals connected in the output circuits of each multivibrator stage, and a system of coding switches connected with said switch terminals for conditionally mixing signals from one of said terminals with signals from another of said terminals to provide a composite coding signal.

2. A system as defined in claim 1 wherein there is additionally provided an electronic reproducer for visual images said reproducer including a scanning means and means coupled with said scanning means responsive to said coded signal to cause irregular scanning displacement in said reproducer.

3. A signal generator system as defined in claim 1 wherein said system forms a part of an audience-financed television receiver apparatus having a multi-compartment coin receptacle for actuating said receiver upon receipt of coins and wherein at least one of said coding switches is provided with a position indicia means designating predetermined program codes, and coupling means between said switch and said coin receptacle for altering the distribution of coins in said compartments in accordance with different coding switch positions.

4. In an audience-financed television receiving system, a picture degarbling code generator, switching means coupled with said generator for selectively causing said generator to produce predetermined individual code signals, a coin receptacle having mechanical means for storing coins in predetermined compartments, each of said compartments being designated to correspond with a particular individual code selectable by said switching means, means included in said coin receptacle for conditioning the operation of said television receiving system upon receipt of a coin in said receptacle, and means coupled with said switching means and said coin receptacle mechanical means for synchronizing the action of said switching means with said mechanical means such that coins are distributed among said compartments in accordance with selection of predetermined codes.

5. A coin collecting mechanism for an audience-financed television system comprising in combination: a television signal reproducer having a station selector means capable of conditioning said reproducer for reception of signals from one of a plurality of television stations; a coin operated switch means electrically coupled with said reproducer for further conditioning its successful reception and reproducing of television signals upon operation by a coin; a coin collecting container having a plurality of compartments each corresponding to a different one of said plurality of television stations; and coin distribution means associated with said container, said switch means and said selector means for capturing coins in those components corresponding to the station being received at the time of actuation of said switch.

6. In a subscriber television system, a picture scanning means, a source of control signal productive of controlled signals timed to occur at periods corresponding to desired phases of said scanning means action, a scanning garbling means coupled with said scanning means, an electrical counter circuit having a plurality of output terminals at which conditionally occur indicating signals representing predetermined counts within said counting circuit, means coupled between said control signal source and said counter circuit for stepping said counter in accordance with said control signals and means coupled with said counting circuit output terminals and said deflection garbling means for conditionally garbling said scanning means upon the attainment of predetermined counts in said counting circuit.

7. A subscriber television system according to claim 6 wherein said counting circuit is of the resettable variety and wherein there is additionally provided means coupled with said counting circuit and said signal source for conditionally resetting said counter circuit.

8. In a subscriber television system, a television picture scanning means under the control of synchronizing pulses, means coupled with said scanning means for controlling the action of said picture scanning means in accordance with a picture code signal, an electrical counter circuit having a plurality of counter indicating output terminals at which appear signals suitable for use as picture code control signals, means for coupling said counter output terminals to said scanning control means for picture code signal control thereof and means coupled with said counter circuit and responsive to synchronizing pulses for stepping said counter circuit during periods defined by said synchronizing pulses.

References Cited in the file of this patent

UNITED STATES PATENTS

| | | |
|---|---|---|
| 1,032,843 | Kohler | July 16, 1912 |
| 1,752,750 | Mills | Apr. 1, 1930 |
| 2,401,405 | Bedford | June 4, 1946 |
| 2,487,682 | Wendt | Nov. 8, 1949 |
| 2,510,046 | Ellett | May 30, 1950 |
| 2,547,598 | Roschke | Apr. 3, 1951 |
| 2,566,764 | Fyler et al. | Sept. 4, 1951 |
| 2,573,349 | Miller et al. | Oct. 30, 1951 |